United States Patent [19]

Guioth et al.

[11] Patent Number: 4,710,281

[45] Date of Patent: Dec. 1, 1987

[54] PROCESS FOR COATING AN ELECTRICALLY CONDUCTIVE SUBSTRATE AND AN AQUEOUS COATING COMPOSITION BASED ON A CATIONIC BINDER

[75] Inventors: Chantal H. Guioth, Rantigny; Etienne G. Maze, Breuil le Vert; Loïck P. Rabajoie, Chantilly, all of France

[73] Assignee: Akzo NV, Arnhem, Netherlands

[21] Appl. No.: 882,379

[22] Filed: Jul. 7, 1986

[30] Foreign Application Priority Data

Jul. 5, 1985 [NL] Netherlands ............... 8501939

[51] Int. Cl.$^4$ ............................................. C25D 13/06
[52] U.S. Cl. ............................ 204/181.7; 427/385.5; 427/386; 427/388.2
[58] Field of Search .............. 204/181.7; 427/385.5, 427/386, 388.2

[56] References Cited

U.S. PATENT DOCUMENTS

| 3,954,588 | 5/1976 | Hazan et al. | 204/181.7 |
|---|---|---|---|
| 4,134,816 | 1/1979 | Bosso et al. | 204/181.7 |
| 4,511,446 | 4/1985 | Abbey et al. | 204/181.7 |
| 4,517,343 | 5/1985 | Schupp et al. | 204/181.7 |
| 4,554,212 | 11/1985 | Diefenbach et al. | 204/181.7 |
| 4,579,889 | 4/1986 | Kaffen et al. | 204/181.7 |
| 4,600,485 | 7/1986 | Patzschke et al. | 204/181.7 |
| 4,608,139 | 8/1986 | Craun et al. | 204/181.7 |
| 4,608,314 | 8/1986 | Turpin et al. | 204/181.7 |
| 4,624,762 | 11/1986 | Abbey et al. | 204/181.7 |
| 4,661,223 | 4/1987 | Zedler et al. | 204/181.7 |

FOREIGN PATENT DOCUMENTS 0021404  2/1986  Japan .

*Primary Examiner*—Joseph L. Schofer
*Assistant Examiner*—J. M. Reddick
*Attorney, Agent, or Firm*—Parkhurst & Oliff

[57] ABSTRACT

A process is provided for coating an electrically conductive substrate with an aqueous coating composition containing a cationic binder wherein the binder is obtained by polymerization of 100 parts by weight of a specified monomer mixture in the presence of 0.25 to 4 parts by weight of an acrylic or methacrylic bisphenol ester. The invention also pertains to the aqueous composition as such.

16 Claims, No Drawings

PROCESS FOR COATING AN ELECTRICALLY CONDUCTIVE SUBSTRATE AND AN AQUEOUS COATING COMPOSITION BASED ON A CATIONIC BINDER

The invention relates to a process for coating an electrically conductive substrate with an aqueous coating composition based on a cationic binder. The cationic binder is obtained by polymerization of a monomer mixture in the presence of a polyethylenically unsaturated compound, amino groups present in the binder being at least partially neutralized with an acid. The monomer mixture consists of (a) 1–30% by weight of a hydroxy(cyclo)alkyl (meth)acrylate of which the (cyclo)alkyl group contains 2–8 carbon atoms, (b) 4–45% by weight of an amino (meth)acrylate of the formula

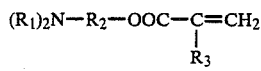

wherein at least one of the groups $R_1$ is an organic group containing 1–12 carbon atoms and the other group $R_1$ is an organic group containing 1–12 carbon atoms or a hydrogen atom, or the two groups $R_1$, together with the nitrogen atom attached thereto, form a heterocyclic group, $R_2$ is a hydrocarbon group containing 2–12 carbon atoms and $R_3$ is a hydrogen atom or a methyl group, (c) 0–80% by weight of a monovinyl aromatic hydrocarbon containing 8–14 carbon atoms, and (d) 0–50% by weight of a different monoethylenically unsaturated monomer containing 2–20 carbon atoms. A process of the type indicated above is known from European Patent Application No. 104,683, the polyethylenically unsaturated compound proposed in it being a particular polyester. The resulting coating satisfactorily covers edges and displays good resistance to chemical attack and outdoor exposure. It has now been found, however, that the use of a different polyethylenically unsaturated compound results in a further improvement of gloss and resistance to corrosion while the above properties are kept at the same level.

The process according to the invention is characterized in that the polyethylenically unsaturated compound is an acrylic or methacrylic bisphenol ester of the general formula

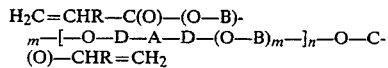

wherein R is a hydrogen atom or a methyl group, and A is a hydrocarbon group containing 1–4 carbon atoms, B represents an organic group containing 2 or 3 carbon atoms, D represents a phenylene group or a cyclohexylene group, m is a number from 1–4 and n is a number from 1–3. The ester is present in an amount of 0.25–4 parts by weight per 100 parts by weight of the monomer mixture.

Examples of suitable hydroxy(cyclo)-alkyl (meth)acrylates suitable for use in the monomer mixture include hydroxyethyl acrylate, hydroxyethyl methacrylate, hydroxypropyl acrylate, hydroxypropyl methacrylate, hydroxybutyl acrylate, hydroxyhexyl acrylate, hydroxyoctyl acrylate and hydroxycyclohexyl acrylate. It is preferred that use should be made of hydroxyalkyl (meth)acrylates, more particularly hydroxyethyl acrylate and/or hydroxypropyl methacrylate. It is preferred that the monomer mixture should contain 5–24% by weight of hydroxy(cyclo)alkyl (meth)acrylate. As used herein, the term "hydroxy(cyclo)alkyl (meth)acrylate" refers to hydroxyalkyl acrylates, hydroxyalkyl methacrylates, hydroxycycloalkyl acrylates and/or hydroxycycloalkyl methacrylates.

Examples of amino (meth)acrylates suitable for use in the monomer mixture include methylaminoethyl (meth)acrylate, dimethylaminoethyl (meth)acrylate, diethylaminoethyl (meth)acrylate, propylaminoethyl (meth)acrylate, tert. butylaminoethyl (meth)acrylate, hexylaminobutyl (meth)acrylate, cyclohexylaminoethyl (meth)acrylate, dimethylcyclohexylaminoethyl (meth)acrylate, octylaminoethyl (meth)acrylate, dodecylaminoethyl (meth)acrylate, pyridylethyl (meth)acrylate and the chloride or sulphate of trimethylammoniumethyl (meth)acrylate. It is preferred that use should be made of a (di)alkylamino (meth)acrylate of which the alkyl group(s) has (have) 1–4 carbon atoms. More particularly, use is made of a β-(di)alkylaminoethyl (meth)acrylate of which the alkyl group(s) has (have) 1–4 carbon atoms, for example: β-dimethylaminoethyl (meth)acrylate and β-diethylaminoethyl (meth)acrylate. It is preferred that the monomer mixture should contain 7–35% by weight, more particularly 7–28% by weight of the amino (meth)acrylate.

The monomer mixture may contain as a third component a monovinyl aromatic hydrocarbon having 8–14, preferably 8–10 carbon atoms. Representative examples include styrene, α-methyl styrene, vinyl toluene and vinyl naphthalene. It is preferred that use should be made of styrene and/or vinyl toluene. It is preferred that the monomer mixture should contain 10–70% by weight of the monovinyl aromatic hydrocarbon.

Finally, the monomer mixture contains 0–50, preferably 0–45% by weight of some other monoethylenically unsaturated monomer having 2–20 carbon atoms, such as acrylic or methacrylic esters, for example: methyl methacrylate, ethyl acrylate, glycidyl methacrylate, butyl acrylate, 2-ethylhexyl acrylate, dodecyl acrylate and hexadecyl acrylate; nitriles, for example: acrylonitrile and methacrylonitrile; and compounds such as vinyl chloride, vinyl acetate and vinyl proprionate; carboxylic acids such as acrylic acid, methacrylic acid, crotonic acid, itaconic acid and maleic acid may generally be applied in an amount not higher than about 1% by weight.

As representative examples of the acrylic or methacrylic bisphenol esters of the above formula (referred to hereinafter as di(meth)acrylic bisphenol esters) to be used according to the invention may be mentioned compounds which are represented by the general formula wherein A represents a methylene group or an isopropylidene group and B represents an ethylene group, a propylene group or a 2-hydroxypropylene group. It is preferred that use should be made of the dimethacrylic ester of ethoxylated or propoxylated 2,2-bis(p-hydroxyphenyl)propane having 2 alkoxy groups, which is represented by the general formula wherein R represents a methyl group, B an ethylene group or propylene group, A an isopropylidene group and D a p-phenylene group, and m and n are equal to 1. Another preferred di(meth)acrylic bisphenol ester is the adduct of acrylic acid or methacrylic acid to the diglycidyl ether of 2,2-bis(p-hydroxyphenyl)propane of a molecular weight of 950, which adduct is represented by the general formula wherein R is a hydrogen atom or a methyl group, B a 2-hydroxypropylene group, D a p-phenylene group, A an isopropylidene group, and m is equal to 1 and n is equal to 3.

It is preferred that the binder should be obtained by polymerization of 0.5-2.2 parts by weight of the di(-meth)acrylic bisphenol ester per 100 parts by weight of the monomer mixture.

Polymerization of the monomer mixture in the presence of the di(meth)acrylic bisphenol ester may be carried out by methods known in themselves, use being made of a free radical initiator in an organic solvent at a temperature generally in the range of 10° to 130° C., use being made of ultraviolet radiation, if desired. For instance, polymerization may take place with continuously adding a mixture of the monomers and initiator to the di(meth)acrylic bisphenol ester and the monomer composition that is chosen may be constant or variable.

Examples of suitable solvents include polar solvents such as ketones, for instance: methylethyl ketone; alcohols, for instance: the ethyl ether or the butyl ether of ethylene glycol; and the ethyl ether of ethylene glycol acetate. Generally, use is made of initiators which have such a half-life period at the chosen polymerization temperature that throughout the polymerization reaction a certain amount of initiator is present. Preferably, the polymerization is continued up to a conversion of the monomer mixture of at least 95%, more particularly 98-100%.

Examples of suitable radical initiators include 2,2'-azo-bis-isobutyronitrile, benzoyl peroxide, tert. butyl peroctoate and methylethyl ketone peroxide. The initiator is usually employed in an amount of 0.2-8, preferably 1-7% by weight, based on the weight of the monomer mixture. Optionally, the initiator may be added to the polymerization mixture batchwise.

For the resulting polymerization product to be made cationic and water-soluble the amino groups present should at least partly be neutralized. This is generally done in a known manner and with the aid of an inorganic or organic acid. Examples of suitable acids include boric acid, phosphoric acid, sulphuric acid, sulphurous acid, hydrochloric acid, formic acid, acetic acid, propionic acid, glycolic acid, thioglycolic acid, diglycolic acid, lactic acid, thiopropionic acid, tartaric acid, malic acid or citric acid. Generally, use is made of mixtures of acids. It is preferred that use should be made of lactic acid. Neutralization may be carried out stepwise, if desired. It is preferred that 30-100% of the available amino groups of the binder should be neutralized. The pH of the composition is generally in the range of 3-7, preferably 4-5.

The preparation of the aqueous coating composition is effected in a simple manner, for instance by adding deionized water to the at least partly neutralized binder to a concentration level of about 30-50% by weight. Subsequently, the resulting solution is diluted with water to a commonly used concentration of 1-35% by weight, preferably 5-20% by weight. The aqueous coating composition further contains a curing agent for the hydroxyl groups-containing polymerization product. Representative curing agents include blocked polyisocyanates. Examples of suitable polyisocyanates include aliphatic, cycloaliphatic or aromatic diisocyanates such as trimethylene diisocyanate, tetramethylene diisocyanate, hexamethylene diisocyanate, trimethyl hexamethylene diisocyanate, 1,2-propylene diisocyanate, 2,3-butylene diisocyanate, ω,ω'-dipropyl ether diisocyanate, 1,2-cyclohexane diisocyanate, 1,4-cyclohexane diisocyanate, isophorone diisocyanate, dicyclohexylmethane-4,4'-diisocyanate, 3,3'-dimethyl-dicyclohexylmethane-4,4'-diisocyanate, xylylene diisocyanaat, 1,5-dimethyl-2,4-bis(isocyanatomethyl)-benzene, 1,5-dimethyl-2,4-bis(2-isocyanatoethyl)benzene, 1,3,5-triethyl-2,4-bis(isocyanatomethyl)benzene, 4,4'-diphenylmethane diisocyanate, 2,4-toluene diisocyanate, 2,6-toluene diisocyanate, naphthalene diisocyanate, dianisidine diisocyanate, 4,4'-diphenylether diisocyanate.

Also suitable for use are higher functional polyisocyanates such as the adduct of 3 molecules of hexamethylene diisocyanate and 1 molecule of water (available under the trademark Desmodur N of Bayer), the adduct of 1 molecule of trimethylol propane and 3 molecules of toluene diisocyanate (available under the trademark Desmodur L of Bayer) and the adduct of 1 molecule of trimethylol propane and 3 molecules of isophorone diisocyanate, and compounds such as 1,3,5-triisocyanatobenzene and 2,4,6-triisocyanatotoluene.

Examples of suitable, known blocking agents for the polyisocyanate include alcohols, lactams, hydroxamates and oximes. As examples of suitable alcohols, which may be aliphatic, cycloaliphatic or alkylaromatic, may be mentioned propanol, 1-butanol, 2-butanol, isobutanol and pentanols. Examples of suitable lactams include ε-caprolactam, butyrolactam and 2-pyrrolidone. As examples of suitable oximes may be mentioned ethylmethyl ketoxime. Preference is given to the use of blocked polyisocyanates as curing agent in cases where the aqueous coating composition is to be applied to the substrate cataphoretically. Other curing agents are, for instance, N-methylol and/or N-methylol ether groups-containing aminoplasts obtained by reacting an aldehyde, for example formaldehyde, with an amino or amido groups-containing compound such as melamine, urea, N,N'-ethylene urea, dicyandiamide and benzoguanamine; for the preparation of these compounds see, for instance, Houben-Weyl, Methoden der organischen Chemie, Volume 14/2, pp. 319-371 (1963). It is preferred that the afore-described compounds should entirely or partly be etherified with alcohols having 1 to 6 carbon atoms, for example with methanol, ethanol, n-propanol, isopropanol, n-butanol, isobutanol, amyl alcohol, hexanol or mixtures of the above-envisaged alcohols. Especially, use can be made of a methylol melamine having 4 to 6 methylol groups per melamine molecule, at least 3 methylol groups being etherified with methanol, ethanol, propanol or butanol. More particularly, use can be made of a hexaalkoxymethyl melamine with the alkoxy group having 1 to 4 carbon atoms.

The aqueous coating composition may contain conventional adjuvants and additives, for instance: surface active compounds, anti-sag agents, dispersing agents, antioxidants, dispersion stabilizers, co-solvents, pigments and dyes. As examples of suitable pigments may be mentioned iron oxide, lead oxide, strontium chromate, carbon black, titanium dioxide, talc, silica, barium sulphate, cadmium yellow, cadmium red and phthalocyanine pigments.

As substrate there is used in the present process an electrically conductive substrate, which may for instance be of a pretreated or nonpretreated metal or alloy, such as iron, steel, zinc plated iron, copper, brass or aluminium, or an electrically conductive synthetic material or rubber. The aqueous coating composition may be applied to an electrically conductive substrate for instance by brushing, spraying, dipping, electrostatic spraying, but preferably by cataphoresis. Cataphoresis may be carried out in the usual manner, for instance at a voltage of 50–500, preferably 100–350, and an initial current density of 0.1–40 A/m². However, if desired, the aqueous coating composition may also be applied to any electrically non-conductive substrate.

After the coating has been applied to the substrate, it is baked at a temperature of, for instance, 90°–250° C., preferably 110°–200° C. The time required for baking depends on the baking temperature and generally varies between 5 and 45 minutes.

The invention also pertains to an aqueous coating composition based on a cationic binder. The binder is obtained by polymerization of a monomer mixture in the presence of a polyethylenically unsaturated compound, the amino groups present in the binder being at least partially neutralized with an acid. The mixture consists of (a) 1–30% by weight of a hydroxy(cyclo)alkyl (meth)acrylate of which the (cyclo)alkyl group contains 2–8 carbon atoms, (b) 4–45% by weight of an amino (meth)acrylate of the formula

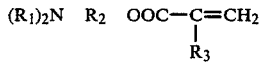

wherein at least one of the groups $R_1$ is an organic group containing 1–12 carbon atoms and the other group $R_1$ is an organic group containing 1–12 carbon atoms or a hydrogen atom, or the two groups $R_1$, together with the nitrogen atom attached thereto, form a heterocyclic group, $R_2$ is a hydrocarbon group containing 2–12 carbon atoms and $R_3$ is a hydrogen atom or a methyl group, (c) 0–80% by weight of a monovinyl aromatic hydrocarbon containing 8–14 carbon atoms, and (d) 0–50% by weight of a different monoethylenically unsaturated monomer containing 2–20 carbon atoms. The polyethylenically unsaturated compound is an acrylic or methacrylic bisphenol ester of the general formula

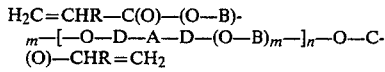

wherein R is a hydrogen atom or a methyl group, and A is a hydrocarbon group containing 1–4 carbon atoms, B represents an organic group containing 2 or 3 carbon atoms, D represents a phenylene group or a cyclohexylene group, m is a number from 1–4 and n is a number from 1–3. The ester is present in an amount of 0.25–4 parts by weight per 100 parts by weight of the monomer mixture.

The invention will be further described in, but not limited by, the following examples. Unless otherwise indicated, all parts and percentages are by weight. The cured coatings obtained according to the Examples were tested for hardness in conformity with NF T 30-016, for adhesion in accordance with DIN 53151, for flexibility in accordance with NF T 30-040 (cylindrical bending), for gloss in accordance with ASTM D 523 (angle of 60°) and for resistance to corrosion in an exposure for 400 hours to a salt spray in conformity with ASTM-B-117-64 (the results are expressed as $C_xYA_z$, where x and z denote the degree of rust formation in mm, respectively on either side of the scratch and on the edge of the panel, and the value y=10 means that there was no blistering). The edge covering was assessed by microscope. The thickness of the coating was measured in the cured state.

EXAMPLE 1

In a reactor equipped with a stirrer and a reflux condenser 0.44 parts of the methacrylic ester of ethoxylated Bisphenol A (the compound of the general formula wherein R is a methyl group, B an ethylene group, D a p-phenylene group, A an isopropylidene group, and m and n are both equal to 1) were mixed with 38.2 parts of monobutyl ether of ethylene glycol and the resulting mixture was heated to a temperature of 100° C. Subsequently, a mixture of 32.4 parts of styrene, 11.4 parts of hydroxyethyl acrylate, 8.1 parts of methyl methacrylate, 6.8 parts of dimethylaminoethyl methacrylate and 0.88 parts of 2.2′-azo-bis-isobutyronitrile was introduced into the reactor over a period of 3 hours in such a way that the temperature of the reactor contents remained 95°–105° C. After the monomer mixture has been added, the reactor contents were kept at a temperature of 100° C. for 1 hour. Finally, a mixture of 0.6 parts of 2.2′-azo-bis-isobutyronitrile and 1.2 parts of monobutyl ether of ethylene glycol was added to the reactor contents in 2 equal portions, each of them over a period of 1 hour, in the process of which and for 2 more hours the reaction mixture was kept at a temperature of 95°–105° C. The resulting binder solution had a solids content of 59.4% and after dilution with monobutyl ether of ethylene glycol to a solids content of 50% it had a Gardner Holdt viscosity at 25° C. of Z3-Z4.

A coating composition was prepared by intermixing 64.0 parts of the aforedescribed binder solution, 14.0 parts of an 80%-solution of the adduct completely blocked with ε-caprolactam of 3 molecules of hexamethylene diisocyanate and 1 molecule of water in the ethyl ether of ethylene glycol acetate, 35.0 parts of rutile titanium dioxide, 6.0 parts of monobutyl ether of ethylene glycol, 1.5 parts of an 85%-aqueous solution of phosphoric acid and deionized water in an amount such that a composition having a solids content of 12.0% was obtained.

The aqueous coating composition was applied to a steel panel (Bonder 132) by cataphoretic deposition at a voltage of 250, a temperature of 25° C. and an initial current density of 20 A/m² to a coating thickness of 35–40 μm and subsequently cured for 25 minutes at a temperature of 180° C. The measured properties of the coating are given in the Table.

EXAMPLE 2

The procedure of Example 1 was repeated, except that use was made of a monomer mixture of 36.4 parts of styrene, 11.4 parts of hydroxyethyl acrylate, 4.1 parts of methyl methacrylate, 6.8 parts of dimethylaminoethyl methacrylate (and 0.88 parts of 2.2′-azo-bis-isobutyronitrile). The resulting binder solution had a solids content of 59.9% and upon dilution with monobutyl ether of ethylene glycol to a solids content of 50% it had a Gardner Holdt viscosity at 25° C. of Z₄. The coating applied was cured at a temperature of 160°–180° C. instead of 180° C. The measured properties of the coating are given in the Table.

EXAMPLE 3

The procedure of Example 1 was repeated, except that use was made of 0.77 parts instead of 0.44 parts of the methacrylic ester of ethoxylated Bisphenol A and of a monomer mixture consisting of 40.3 parts of styrene, 11.3 parts of hydroxyethyl acrylate, 6.8 parts of dimethylaminoethyl methacrylate (and 0.88 parts of 2.2′-azobis-isobutyronitrile). The resulting binder solution had a solids content of 59.9% and upon dilution with monobutyl ether of ethylene glycol to a solids content of 50% it had a Gardner Holdt viscosity at 25° C. of $Z_4$. The measured properties of the coating are given in the Table.

EXAMPLE 4

The procedure of Example 1 was repeated, except that use was made of 0.77 parts instead of 0.44 parts of the methacrylic ester of ethoxylated Bisphenol A and of a monomer mixture consisting of 40.3 parts of styrene, 11.3 parts of hydroxyethyl acrylate, 6.8 parts of dimethylaminoethyl methacrylate (and 0.88 parts of 2.2′-azobis-isobutyronitrile). The resulting binder solution had a solids content of 59.8% and after dilution with monobutyl ether of ethylene glycol to a solids content of 50% it had a Gardner Holdt viscosity at 25° C. of $Z_4$. The measured properties of the coating are given in the Table.

TABLE

|  | Examples | | | |
| --- | --- | --- | --- | --- |
|  | 1 | 2 | 3 | 4 |
| Hardness | 340 | 340 | 350 | 340 |
| Adhesion | Gt 0 | Gt 0 | Gt 0 | Gt 0 |
| Flexibility (mm) | <5 | <20 | <10 | <5 |
| Edge covering | Excellent | Excellent | Excellent | Excellent |
| Gloss | >80 | >80 | >80 | >80 |
| Salt spray test | $C_5 10 A_0$ | $C_4 10 A_0$ | $C_4 10 A_0$ | $C_2 10 A_0$ |

We claim:

1. A process for coating a substrate, comprising applying to said substrate an aqueous coating composition based on a cationic binder obtained by polymerization of a monomer mixture in the presence of 0.25–4 parts by weight of a polyethylenically unsaturated compound per 100 parts by weight of the monomer mixture, said monomer mixture consisting of (a) 1–30% by weight of a hydroxy(cyclo)alkyl (meth)acrylate of which the (cyclo)alkyl group contains 2–8 carbon atoms, (b) 4–45% by weight of an amino (meth)acrylate of the formula

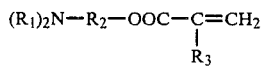

where at least one of the groups $R_1$ is a hydrocarbon group containing 1–12 carbon atoms and the other group $R_1$ is a hydrocarbon group containing 1–12 carbon atoms or a hydrogen atom, or the two groups $R_1$, together with the nitrogen atom attached thereto, form a heterocyclic group, $R_2$ is a hydrocarbon group containing 2–12 carbon atoms and $R_3$ is a hydrogen atom or a methyl group, (c) 0–80% by weight of a monovinyl aromatic hydrocarbon containing 8–14 carbon atoms, and (d) 0–50% by weight of a different monoethylenically unsaturated monomer containing 2–20 carbon atoms;

said polyethylenically unsaturated compound being an acrylic or methacrylic bisphenol ester of the formula

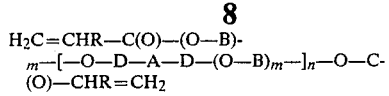

wherein R represents a hydrogen atom or a methyl group, A represents a hydrocarbon group containing 1–4 carbon atoms, B represents a hydrocarbon group containing 2–3 carbon atoms, or a 2-hydroxypropylene group D represents a phenylene group or a cyclohexylene group, m is a number from 1–4 and n is a number from 1–3;

amino groups present in said binder being at least partially neutralized with an acid.

2. A process according to claim 1, wherein the hydroxy(cyclo)alkyl (meth)acrylate used in the monomer mixture is at least one member selected from the group consisting of hydroxyethyl acrylate and hydroxypropyl methacrylate.

3. A process according to claim 1, wherein the monomer mixture contains 5–24% by weight of hydroxy(cyclo)alkyl (meth)acrylate.

4. A process according to claim 1, wherein the amino(meth)acrylate is a (di)alkylamino (meth)acrylate of which the alkyl group(s) has (have) 1–4 carbon atoms.

5. A process according to claim 1, wherein the amino (meth)acrylate is a β-(di)alkylaminoethyl (meth)acrylate of which the alkyl group(s) has (have) 1–4 carbon atoms.

6. A process according to claim 1, wherein the monomer mixture contains 7–35% by weight of amino (meth)acrylate.

7. A process according to claim 1, wherein the monomer mixture contains 7–28% by weight of amino (meth)acrylate.

8. A process according to claim 1, wherein the monovinyl aromatic hydrocarbon has 8–10 carbon atoms.

9. A process according to claim 1, wherein the monovinyl aromatic hydrocarbon is at least one member selected from the group consisting of styrene and vinyl toluene.

10. A process according to claim 1, wherein the monomer mixture contains 10–70% by weight of the monovinyl aromatic hydrocarbon.

11. A process according to claim 1, wherein the monomer mixture contains 0–45% by weight of said different monoethylenically unsaturated monomer.

12. A process according to claim 1, wherein the bisphenol ester is a compound of the formula according to claim 1, wherein R represents a methyl group, B represents an ethylene group or a propylene group, A represents an isopropylidene group and D represents a p-phenylene group, and m and n are equal to 1.

13. A process according to claim 1, wherein the bisphenol ester is a compound of the formula according to claim 1, wherein R represents a hydrogen atom or a methyl group, B represents a 2-hydroxypropylene group, D represents a p-phenylene group, A represents an isopropylidene group and m is equal to 1 and n is equal to 3.

14. A process according to claim 1, wherein 0.5–2.2 parts by weight of the bisphenol ester are polymerized per 100 parts by weight of the monomer mixture.

15. A process according to claim 1, wherein the substrate is electrically conductive and the coating composition is applied to the substrate by cataphoretic deposition at a voltage of 50–500 and an initial current density of 0.1–40 A/m².

16. A process according to claim 1, wherein the coating applied to the substrate is baked at a temperature of 90°–250° C.

* * * * *